US011044288B2

United States Patent
Danker et al.

(10) Patent No.: US 11,044,288 B2
(45) Date of Patent: *Jun. 22, 2021

(54) SYSTEMS AND METHODS FOR INTERACTIVE BROADCASTING

(71) Applicant: Facebook, Inc., Menlo Park, CA (US)

(72) Inventors: Daniel Danker, San Francisco, CA (US); Holly Marie Ormseth, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/562,297

(22) Filed: Sep. 5, 2019

(65) Prior Publication Data

US 2019/0394248 A1    Dec. 26, 2019

Related U.S. Application Data

(63) Continuation of application No. 15/393,046, filed on Dec. 28, 2016, now Pat. No. 10,419,505.

(51) Int. Cl.
*H04L 29/06* (2006.01)
*H04L 29/08* (2006.01)
*H04N 21/475* (2011.01)
*H04N 21/2187* (2011.01)

(52) U.S. Cl.
CPC ........ *H04L 65/4076* (2013.01); *H04L 63/102* (2013.01); *H04L 67/306* (2013.01); *H04L 67/36* (2013.01); *H04N 21/2187* (2013.01); *H04N 21/4756* (2013.01)

(58) Field of Classification Search
None
See application file for complete search history.

(56) References Cited

U.S. PATENT DOCUMENTS

| | | | |
|---|---|---|---|
| 2009/0007195 A1* | 1/2009 | Beyabani | H04N 21/8456 725/86 |
| 2009/0089294 A1 | 4/2009 | Davis et al. | |
| 2010/0251304 A1* | 9/2010 | Donoghue | H04N 21/4755 725/46 |
| 2011/0276396 A1* | 11/2011 | Rathod | H04L 51/066 705/14.49 |
| 2012/0290950 A1 | 11/2012 | Rapaport et al. | |
| 2013/0205322 A1 | 8/2013 | Sinha et al. | |
| 2015/0245079 A1 | 8/2015 | Tremblay | |
| 2016/0269504 A1* | 9/2016 | Johar | H04L 67/141 |
| 2017/0041296 A1* | 2/2017 | Ford | H04W 12/06 |
| 2017/0289234 A1* | 10/2017 | Andreou | G06F 3/04883 |

* cited by examiner

*Primary Examiner* — Davoud A Zand
(74) *Attorney, Agent, or Firm* — Sheppard Mullin Richter & Hampton LLP

(57) ABSTRACT

Systems, methods, and non-transitory computer-readable media can provide an interface through which a live content stream is presented, the live content stream being accessed through a content provider system and providing information describing a voting event for interacting with at least one broadcaster of the live content stream, the voting event including at least a first voting option and a corresponding first feedback option that is capable of being selected to vote for the first voting option by a user operating the computing device.

20 Claims, 10 Drawing Sheets

SYSTEMS AND METHODS FOR INTERACTIVE BROADCASTING

CROSS-REFERENCE TO RELATED APPLICATIONS

This application is a continuation of U.S. patent application Ser. No. 15/393,046, filed on Dec. 28, 2016 and entitled "SYSTEMS AND METHODS FOR INTERACTIVE BROADCASTING", all of which are incorporated in their entireties herein by reference.

FIELD OF THE INVENTION

The present technology relates to the field of content broadcasting. More particularly, the present technology relates to techniques for broadcasting live content

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and live content streams, such as images, videos, and audio. The postings may be published to the social network for consumption by others.

SUMMARY

Various embodiments of the present disclosure can include systems, methods, and non-transitory computer readable media configured to provide an interface through which a live content stream is presented, the live content stream being accessed through a content provider system and provide information describing a voting event for interacting with at least one broadcaster of the live content stream, the voting event including at least a first voting option and a corresponding first feedback option that is capable of being selected to vote for the first voting option by a user operating the computing device.

In an embodiment, the first voting option corresponds to a first topic of interest, and wherein the first feedback option is capable of being selected to vote for the first topic of interest.

In an embodiment, at least one notification is sent to the at least one broadcaster after receiving a threshold number of votes for the first topic of interest, the notification requesting the broadcaster to speak on the first topic of interest.

In an embodiment, the voting event includes a second voting option corresponding to a second topic of interest, and wherein a second feedback option is capable of being selected to vote for the second topic of interest.

In an embodiment, the first feedback option corresponds to at least one option that is capable of being selected through the content provider system.

In an embodiment, the first feedback option is at least one of a like option, a reaction option, posting a comment in response to the live content stream through the content provider system, or sharing the live content stream with other users of the content provider system.

In an embodiment, the first voting option corresponds to a first filter that is capable of being applied to the live content stream, wherein the first feedback option is able to be selected to vote for the first filter, and wherein application of the first filter causes a visual modification in the live content stream.

In an embodiment, the first filter is automatically applied to the live content stream after receiving a threshold number of votes for the first filter.

In an embodiment, the voting event includes a second voting option corresponding to a second filter, and wherein a second feedback option is capable of being selected to vote for the second filter.

In an embodiment, the visual modification corresponds to at least a text overlay, graphical overlay, virtual doodle, text animation, graphical animation, or placement of a face mask.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
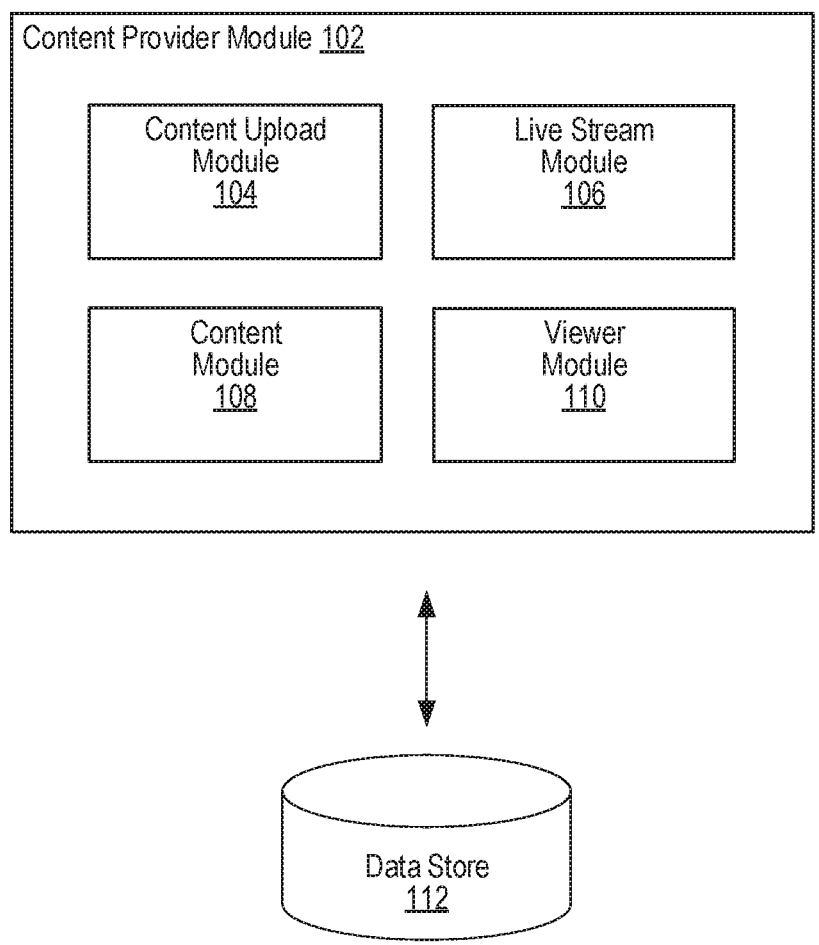
FIG. 1 illustrates an example system including an example content provider module configured to provide access to various content items, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches For Interactive Broadcasting

Today, people often utilize computing devices (or systems) for a wide variety of purposes. Users can use their computing devices to, for example, interact with one another, access content, share content, and create content. In some cases, content items can include postings from members of a social network. The postings may include text and live content streams, such as images, videos, and audio. The postings may be published to the social network for consumption by others.

Under conventional approaches, content may be broadcast through a content provider (e.g., social networking system) using various broadcast mediums (e.g., Internet broadcasting, etc.). In one example, a live content stream can include content that is being captured and streamed live by a user (e.g., a broadcaster). For example, the broadcaster can capture and stream an event (e.g., a live video of the broadcaster, concert, speech, etc.) as part of a live content stream. Such events can be captured using computing devices (e.g., mobile devices with audio and video capture capabilities) and/or standalone devices (e.g., video cameras and microphones). A user (e.g., a viewer) operating a computing device can access the live content stream through the content provider. In response, the content provider encodes and provides data corresponding to the live content stream to the user's computing device over a network (e.g., the Internet) in real-time. The computing device can decode and present the live content stream, for example, through a display screen of the computing device. In general, the live content stream continues to be provided to the user's computing device until the broadcaster discontinues broadcasting the live content stream or the user instructs the computing device to stop accessing the live content stream, for example. In some instances, users viewing the live content stream may want to interact with the broadcaster(s) of the live content stream. Such interaction can be limited under conventional approaches which typically do not provide features that allow viewers to interact with broadcasters. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, a content provider (e.g., social networking system) is configured to provide various options that allow users (or viewers) to interact with broadcasters (and co-broadcasters) of live content streams. For example, in some embodiments, viewers of a live content stream can select and/or vote for filters to be applied to the live content stream. Such filters can involve changing the appearance of a broadcaster, for example, using augmented reality and/or applying graphical overlays. In some embodiments, these filters can also be applied to co-broadcasters of the live content stream. In some embodiments, viewers can also vote on whether they want to see the broadcaster perform some action. In some embodiments, prompts encouraging viewers to vote a certain way can be incorporated into the live content stream to gamify the live broadcast.

FIG. 1 illustrates an example system 100 including an example content provider module 102 configured to provide access to various content items, according to an embodiment of the present disclosure. As shown in the example of FIG. 1, the content provider module 102 can include a content upload module 104, a live stream module 106, a content module 108, and a viewer module 110. In some instances, the example system 100 can include at least one data store 112. The components (e.g., modules, elements, etc.) shown in this figure and all figures herein are examples only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 can be implemented, in part or in whole, as software running on one or more computing devices or systems, such as on a user or client computing device. In one example, the content provider module 102 or at least a portion thereof can be implemented as or within an application (e.g., app), a program, or an applet, etc., running on a user computing device or a client computing system, such as the user device 610 of FIG. 6. In another example, the content provider module 102 or at least a portion thereof can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 630 of FIG. 6.

The content provider module 102 can be configured to communicate and/or operate with the at least one data store 112, as shown in the example system 100. The at least one data store 112 can be configured to store and maintain various types of data. For example, the data store 112 can store information describing various content that is being streamed live through the social networking system and/or content items that have been posted by users of the social networking system. In some implementations, the at least one data store 112 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data.

The content provider module 102 can be configured to provide users with access to content items that are posted through a social networking system. For example, a user can interact with an interface that is provided by a software application (e.g., a social networking application) running on a computing device of the user. This interface can include an option for posting, or uploading, content items to the social networking system. When posting a content item, the content upload module 104 can be utilized to communicate data describing the content item from the computing device to the social networking system. Such content items may include text, images, audio, and videos, for example. The social networking system can then provide the content item through the social networking system including, for example, in one or more news feeds. In some embodiments, the interface can also include an option for live streaming content through the social networking system. When initiating a live content stream, the live stream module 106 can be utilized to communicate data (e.g., audio data, video data, etc.) corresponding to the content to be streamed live from the computing device and through the social networking system. The live stream module 106 can utilize any generally known techniques that allow for live streaming of content including, for example, the Real Time Messaging Protocol (RTMP). In various embodiments, the computing device from which the live content stream is being provided can be equipped to capture data (e.g., video data, audio data, etc.) corresponding to the live content stream.

The interface provided by the software application can also be used to access posted content items, for example, using the content module 108. For example, the content module 108 can include content items in a user's news feed. Such content items may include on-demand content items (e.g., video on-demand or "VOD") as well as content that is being streamed live. In this example, the user can access content items while browsing the news feed. In another example, the user can access content items by performing searches through the interface. For example, the user can search for a given content item or live content stream, for a user that posted a content item or live content stream, and/or for search terms that correspond to a content item or live content stream. In one example, the user may select an option to view a live content stream and, in response, the social networking system can send data corresponding to the live content stream to a computing device of the user. In this example, the social networking system can continue sending data corresponding to the live content stream until, for example, the broadcaster of the live content stream discontinues streaming or if the user selects an option to discontinue playback of the live content stream. The viewer module 110 can be configured to provide various options for interacting with broadcasters of live content streams. More details regarding the viewer module 110 will be provided below with reference to FIG. 2.

Figure 2:
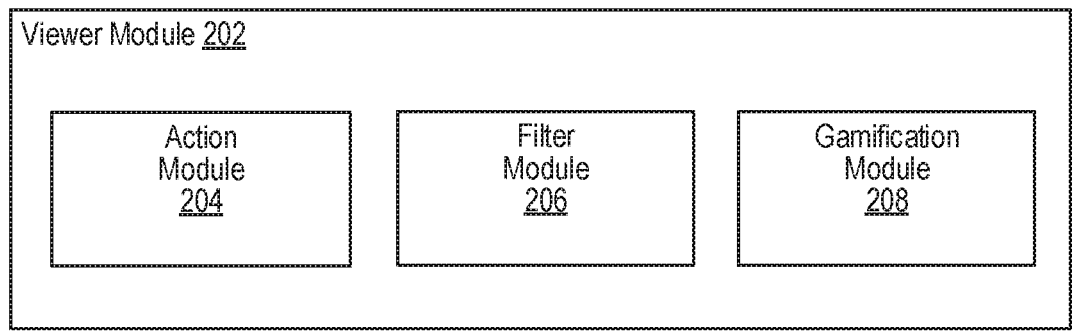
FIG. 2 illustrates an example of a viewer module, according to an embodiment of the present disclosure.

FIG. 2 illustrates an example of a viewer module 202, according to an embodiment of the present disclosure. In some embodiments, the viewer module 110 of FIG. 1 can be implemented as the viewer module 202. As shown in FIG. 2, the viewer module 202 can include an action module 204, a filter module 206, and a gamification module 208.

In various embodiments, the viewer module 202 can provide users (or viewers) accessing live content streams with options for interacting with broadcasters (and co-broadcasters) of those live content streams. In some embodiments, the action module 204 can provide an option for requesting one or more actions to be performed by one or more broadcasters of a live content stream. In some embodiments, this option can be presented in a viewer interface through which the live content stream is being accessed. The viewer interface can be provided by a software application (e.g., social networking application) running on a computing device being operated by a viewer. Other approaches for submitting action requests to broadcasters are possible. For example, in some embodiments, viewers can request actions to be performed by broadcasters by submitting (e.g., posting) comments through the viewer interface in which the live content stream is being presented. In general, actions requested by viewers can be presented to a broadcaster, for example, through a broadcaster interface. The broadcaster interface may be provided by a software application (e.g., social networking application) running on a computing device being operated by the broadcaster. In general, such actions may be performed verbally or physically. For example, the viewer may submit a request asking the broadcaster to speak about a certain topic, to say a certain word or phrase, or utter some sound, to provide some examples. In another example, the viewer may submit a request asking the broadcaster to perform some physical action such as jumping through a hoop or dancing, for example. The broadcaster(s) of the live content stream can decide whether to perform any of the actions requested by viewers during the live broadcast.

In some embodiments, the broadcaster(s) and/or viewer(s) may opt to gamify the requested action(s). For example, a viewer requesting that a certain action be performed may utilize the gamification module 208 to create an interactive game that encourages the broadcaster(s) to perform the requested action(s). In some embodiments, the interactive games can be implemented as one or more voting events that encourage a broadcaster to perform one or more actions. In various embodiments, the gamification module 208 can be used to define parameters for conducting a voting event. For example, a requested action to be performed by a broadcaster can be associated with at least one feedback option (e.g., a "like" option) that can be selected by viewers of the live content stream. Further, respective thresholds for the feedback options can be specified. These thresholds can be used to determine the number of votes (e.g., feedback option selections) that are needed to conclude the voting event. For example, viewers wanting to see a broadcaster perform a certain action can select a pre-defined feedback option that was associated with the action. In some embodiments, a notification asking the broadcaster to perform the action can be presented to the broadcaster when a threshold number of viewers have selected the feedback option. Alternatively, in some embodiments, a notification asking the broadcaster to perform the action can be presented to the broadcaster when the feedback option has been selected a threshold number of times (regardless of the number of viewers that selected the option). In one example, a viewer that wants to see the broadcaster speak on a topic can create an interactive game in which viewers of the live content broadcast can vote a certain way to have the broadcaster speak on the requested topic. In some embodiments, visual prompts encouraging viewers to vote a certain way can be incorporated into the live content stream to make the live broadcast more interactive. In such embodiments, a visual prompt overlay can be shown in the interface through which the live content stream is being presented. In this example, the prompt can ask viewers to select pre-defined feedback option(s) if the viewers want the broadcaster speak on the topic (e.g., "click 'like' if you want the broadcaster to speak about skiing").

In some embodiments, a voting event can include more than one voting option. For example, a voting event can include a first voting option that is associated with a first feedback option and a second voting option that is associated with a second feedback option. In this example, viewers can select one of the feedback options to vote for a given voting option. In one example, viewers participating in a voting event can select a first feedback option to vote for a first action to be performed by a broadcaster or a second feedback option to vote for a second action to be performed by the broadcaster. In general, a feedback option can be any operation that is capable of being performed by viewers to provide feedback to a content provider through which the live content stream is being accessed. In some embodiments, the feedback option can be any operation that can be performed through a content provider system (e.g., social networking system) to provide feedback. For example, a feedback option can correspond to a "like" option, a reaction option, an option to post a comment in response to the live content stream, or an option to share the live content stream (e.g., a content item referencing the live content stream) with other users of the social networking system, to name some examples.

In some embodiments, viewers can interact with broadcasters by suggesting one or more filters to be applied to a live content stream or to specific broadcasters of the live content stream. The filter module 206 can provide viewers with options for requesting the application of various filters to a live content stream. In general, such filters can visually modify the appearance of the live content stream or of one or more broadcasters of the live content stream. Some examples of filters that may be applied to the live content stream include inserting text overlays or drawings (e.g., scribbling, doodling, etc.) using virtual writing instruments (e.g., brushes, markers, etc.), inserting graphical overlays (e.g., icons, stickers, etc.), inserting animations, to name some examples. In some embodiments, the broadcaster of a live content stream has the option to selectively approve viewer requests for applying one or more filters to the live content stream. In some embodiments, options for requesting the application of filters can be presented in a viewer interface through which the live content stream is being accessed. As mentioned, the viewer interface can be provided by a software application (e.g., social networking application) running on a computing device being operated by a viewer. In general, filters requests submitted by viewers can be presented to a broadcaster, for example, through a broadcaster interface which may be provided by a software application (e.g., social networking application) running on a computing device being operated by the broadcaster.

In some embodiments, the broadcaster(s) and/or viewer(s) may opt to gamify the application of requested filters. For example, a viewer requesting that a certain filter be applied to a live content stream may utilize the gamification module 208 to create an interactive game. This interactive game can be used to determine whether or not a given filter is applied to the live content stream. In some embodiments, the interactive game can be implemented as one or more voting events, as described above. For example, the gamification module 208 can be used to define various parameters for a voting event. In one example, a requested filter can be associated with at least one feedback option that is capable of being selected by viewers of the live content stream. Further, respective thresholds for those feedback options can be specified. These thresholds can be used to determine the number of votes (e.g., feedback option selections) that are needed to conclude the voting event. In this example, viewers wanting to see a particular filter be applied to the live content stream can be asked to select a pre-define feedback option that was associated with the filter (e.g., "10,000 likes needed for the broadcaster's face to turn green!"). In some embodiments, a filter is automatically applied to the live content stream when a threshold number of viewers have selected the feedback option. Alternatively, in some embodiments, a filter is automatically applied to the live content stream when the feedback option has been selected a threshold number of times (regardless of the number of viewers that selected the option). As mentioned, in some embodiments, a voting event can include more than one voting option. For example, a voting event can include a first feedback option that can be selected to vote for a first filter to be applied to a live content stream and a second feedback option that can be selected to vote for a second filter to be applied to the live content stream. More details describing the filter module 206 will be provided below with reference to FIG. 3.

Figure 3:
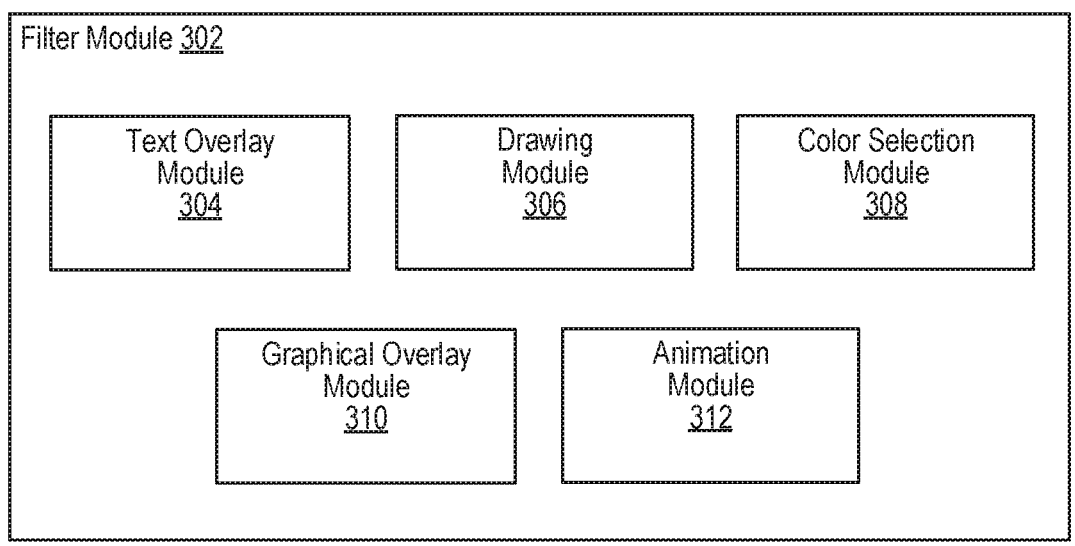
FIG. 3 illustrates an example of a filter module, according to an embodiment of the present disclosure.

FIG. 3 illustrates a filter module 302, according to an embodiment of the present disclosure. In some embodiments, the filter module 206 of FIG. 2 can be implemented with the filter module 302. As shown in the example of FIG. 3, the filter module 302 can include a text overlay module 304, a drawing module 306, a color selection module 308, a graphical overlay module 310, and an animation module 312. In various embodiments, the filter module 302 can provide an editing interface that allows a viewer to visually modify a live content stream while accessing the live content stream. For example, a viewer operating a computing device can access the editing interface through a software application (e.g., a social networking application) running on the computing device. The editing interface may be accessed when the viewer is viewing a live content stream through the social networking system. In some embodiments, visual modifications made to a live content stream by one viewer are shared with other users that are also viewing the live content stream. That is, the visual modifications are visible in the respective viewer interfaces being accessed by the other viewers.

In some embodiments, the editing interface can provide an option for adding one or more text overlays to the live content stream. When this option is selected, the text overlay module 304 can allow the viewer to input text to be incorporated into the live content stream. For example, the viewer can input the text through a computing device being operated by the viewer. In some embodiments, a virtual keyboard is presented in the editing interface to allow the user to input text. The use can modify the font, or style, used for the text overlays. The user can also modify the color(s) used for the text overlays through the color selection module 308. In various embodiments, the user can drag and position the text overlays in the live content stream as desired. In some embodiments, a text overlay can be wrapped, for example, around shapes (e.g., circle, square, etc.) to create curve-shaped or bent text.

In some embodiments, the editing interface can provide an option for drawing content (e.g., doodling) in the live content stream. When this option is selected, the drawing module 306 can present an interface that allows the viewer to select a virtual writing instrument. The viewer can use a selected virtual writing instrument to doodle virtually in the live content stream. In some embodiments, the virtual writing instruments that are available for selection include a marker, a brush, and eraser. In some embodiments, the interface also includes a color palette from which the user can select colors to be used when drawing with the selected writing instrument. In some embodiments, the user can adjust the tip size of a selected writing instrument, for example, by increasing or decreasing a tip size selector. Once a virtual writing instrument is selected, the user can doodle using the virtual writing instrument directly through a touch screen display of the computing device, for example, using the user's finger as a physical drawing instrument. Visual modifications that result from such user interaction can be presented as an overlay in the interface through which the live content stream is being presented.

In various embodiments, the color selection module 308 can provide the user with options for selecting a color to be used, for example, when drawing using a virtual writing instrument or inputting text. In some embodiments, the color selection module 308 provides a virtual color palette that includes options for selecting various colors that are available. In some embodiments, the color selection module 308 provides a virtual color spectrum from which the user can select colors. For example, the user can tap and navigate the user's finger across the virtual color spectrum to choose a desired color. In some embodiments, the color selection module 308 can provide an eyedropper tool option. The user can use the eyedropper tool to select a portion of a live content stream. Upon selecting the portion, the color selection module 308 can select a color corresponding to the selected portion, for example, to be used when drawing or inputting text.

In some embodiments, the graphical overlay module 310 can provide the user with options for inserting graphical overlays in live content streams. For example, the graphical overlay module 310 can provide the user with a set of virtual stickers that can be inserted in a live content stream. Upon selecting one or more of the virtual stickers, the graphical overlay module 310 can insert the selected virtual stickers into the desired live content stream. The user can drag and position any of the virtual stickers in the live content stream as desired, for example, by performing various touch screen gestures (e.g., drag gesture). In some embodiments, the graphical overlay module 310 provides suggestions for graphical overlays, or virtual stickers, to be used in a live content stream. In such embodiments, the graphical overlay module 310 can analyze the subject matter of the live content stream, for example, using a trained machine learning model (e.g., content classifier) to identify various objects (e.g., identities, or names, of individuals, objects, activities, products, logos, animals, points of interest, or other concepts) present in the live content stream. Based on the identified objects, the graphical overlay module 310 can suggest various graphical overlays to the viewer.

In some embodiments, the animation module 312 can provide the user with options for animating text. For example, after inputting text, the user can select an animate option that causes the text to animate. The animate options can include options to make characters in the text move along one or more directions (e.g., jiggling characters, animating text along in a specified trajectory or path, text moves around in the interface and bounces off the edges of the interface, etc.). In some embodiments, the animation module 312 can provide the user with options for inserting animated graphical overlays in live content streams. In some embodiments, the graphical overlays are animated virtual stickers, as described above. In some embodiments, the graphical overlays are animated to trace, or follow, a one or more paths, trajectories, or boundaries of objects in the live content stream. One example of animated graphical overlays can include various masks that can be positioned over faces (e.g., faces of broadcasters) in live content streams. In some embodiments, the rate, or speed, at which a graphical overlay is animated can be adjusted. In some embodiments, the user operating the computing device can manually define an outline along which a graphical overlay will be positioned and animated in a live content stream. In some embodiments, the animation module 312 can automatically determine one or more outlines along which a graphical overlay will be animated in a live content stream, for example, using generally known line detection techniques and/or edge detection techniques. In some embodiments, animated graphical overlays can be suggested by detecting facial features in a live content stream using generally known face detection techniques. In this example, the placement of a given animated graphical overlay can be determined based on facial features (e.g., eyes, nose, mouth, ears, etc.) that were detected in a live content stream. In some embodiments, such outlines can be provided to viewers as suggestions when selecting filters to be applied in the live content stream. In some embodiments, viewers can upload their own graphical overlays to be incorporated into live content streams using the techniques described above. As mentioned, any visual modification of a live content stream that results from applying the any of the filters described above can be presented as overlays in the respective interfaces through which the live content stream is being accessed.

Figure 4A:
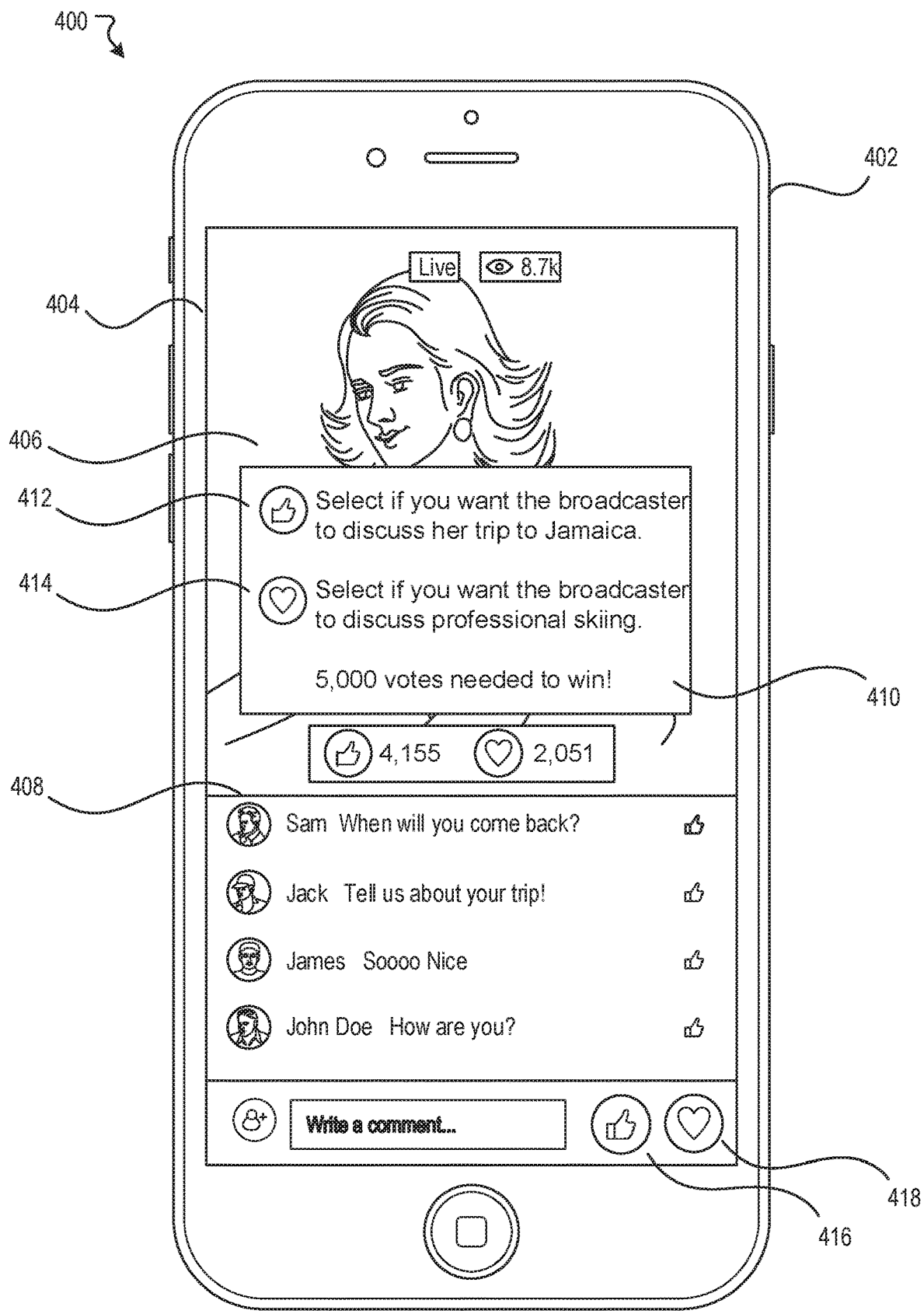
FIGS. 4A-D illustrate example interfaces for interacting with live content streams, according to an embodiment of the present disclosure.

FIG. 4A illustrates an example 400 of an interface 404 for interacting with a live content stream, according to an embodiment of the present disclosure. The interface 404 is presented on a display screen of a computing device 402. The interface 404 may be provided through an application (e.g., a web browser, a social networking application, etc.) running on the computing device 402. In this example, the interface 404 includes a region 406 in which the live content stream being accessed is displayed. The interface 404 also includes a region 408 in which comments posted by various users in response to the live content stream are displayed. In some embodiments, the interface 404 can present a visual prompt 410 for interacting with the live content stream. In the example of FIG. 4A, the visual prompt 410 provides viewers with information describing a voting event that is in progress. The voting event includes a first voting option 412 that can be selected to ask the broadcaster to discuss her trip to Jamaica and a second voting option 414 to ask the broadcaster to discuss professional skiing. The visual prompt 410 can also indicate the threshold number of votes needed for a voting option before the voting event concludes (e.g., 5,000 votes). In this example, the first voting option 412 is associated with a first feedback option 416 (e.g., a "like" option) and the second voting option 414 is associated with a second feedback option 418 (e.g., a "heart" reaction option). Viewers of the live content stream can select either of these feedback options through their respective interfaces to vote for a corresponding voting option.

Figure 4B:
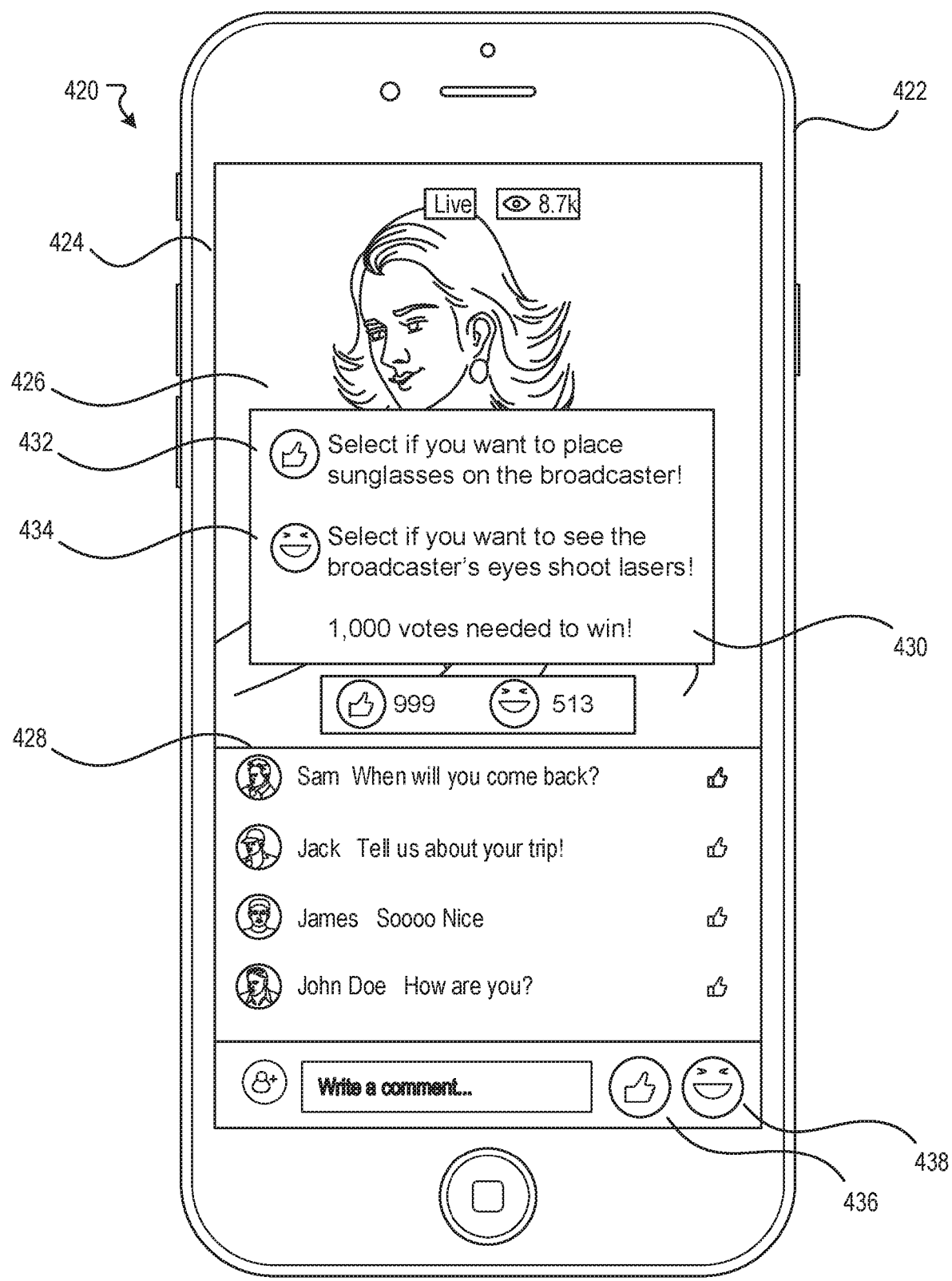
Figure 4C:
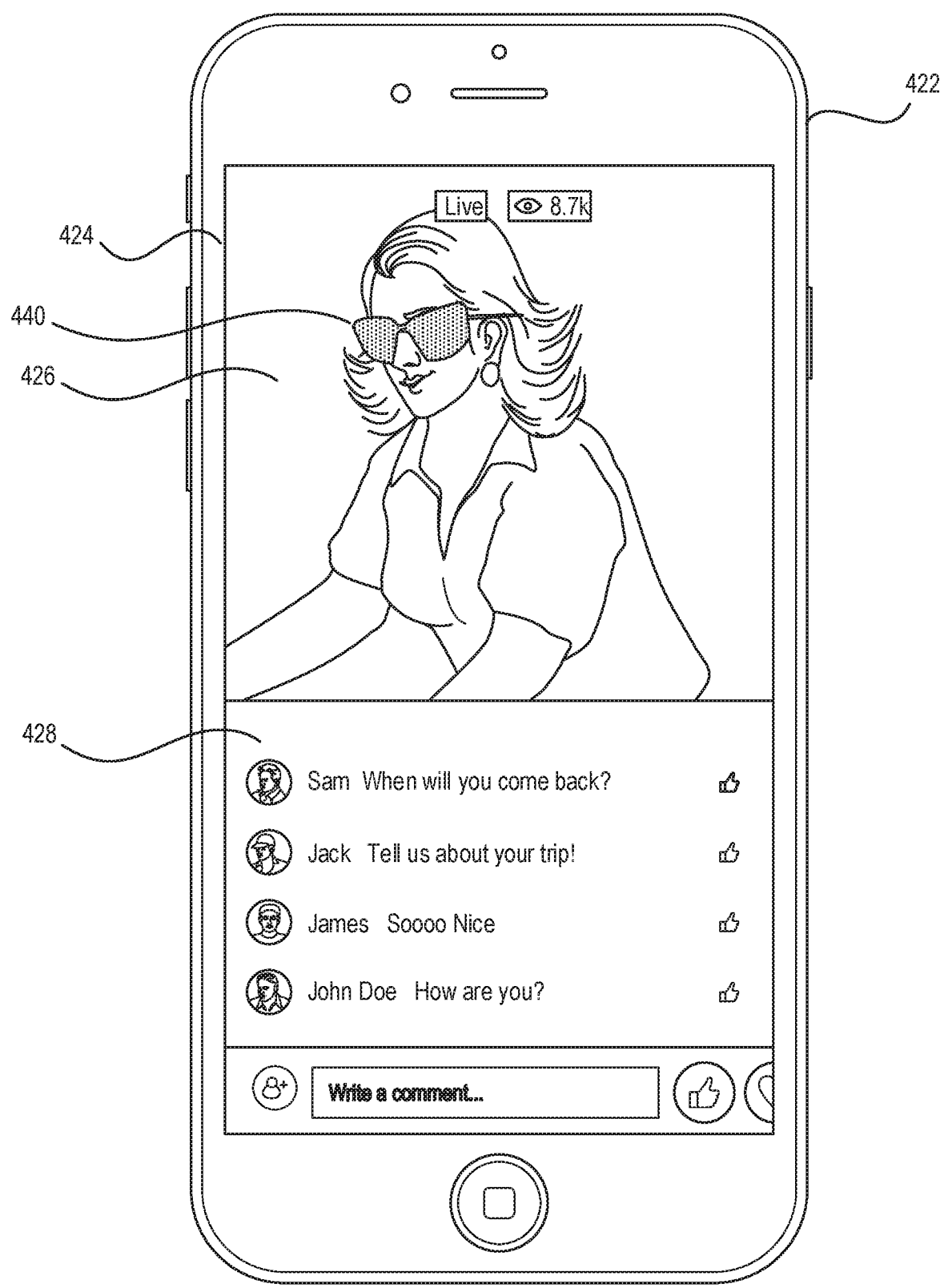
Figure 4D:
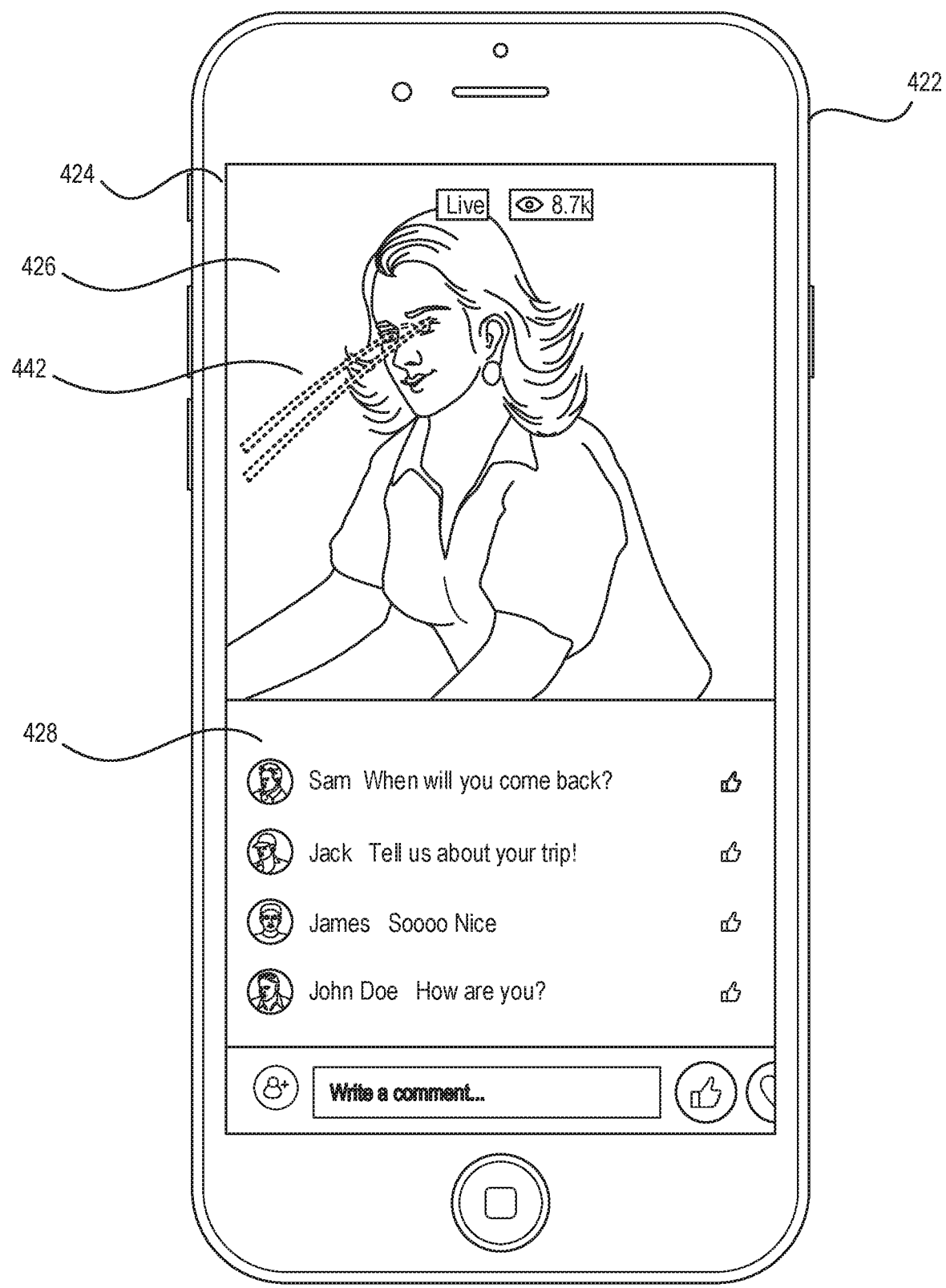

FIG. 4B illustrates an example 420 of an interface 424 for interacting with a live content stream, according to an embodiment of the present disclosure. The interface 424 is presented on a display screen of a computing device 422. The interface 424 may be provided through an application (e.g., a web browser, a social networking application, etc.) running on the computing device 422. In this example, the interface 424 includes a region 426 in which the live content stream being accessed is displayed. The interface 424 also includes a region 428 in which comments posted by various users in response to the live content stream are displayed. In some embodiments, the interface 424 can present a visual prompt 430 for interacting with the live content stream. In the example of FIG. 4B, the visual prompt 430 provides viewers with information describing a voting event that is in progress. The voting event includes a first voting option 432 that can be selected to visually modify the live content stream by placing virtual sunglasses over the broadcaster's eyes using augmented reality. The voting event also includes a second voting option 434 that can be selected to visually modify the live content stream by having virtual laser beams appear from the broadcaster's eyes using augmented reality. The visual prompt 430 can also indicate the number of votes needed for a voting option before the voting event concludes (e.g., 1,000 votes). In this example, the first voting option 432 is associated with a first feedback option 436 (e.g., a "like" option) and the second voting option 434 is associated with a second feedback option 438 (e.g., a "laugh" reaction option). Viewers of the live content stream can select either of these feedback options to vote for a corresponding voting option. In this example, if the threshold number of votes (e.g., 1,000 votes) are received for the first voting option 432, then a virtual pair of sunglasses 440 can automatically be positioned and displayed over the broadcaster's eyes, as illustrated in the example of FIG. 4C. Similarly, if the threshold number of votes (e.g., 1,000 votes) are received for the second voting option 434, then laser beams 442 can automatically be positioned and displayed as originating from the broadcaster's eyes, as illustrated in the example of FIG. 4D. In some embodiments, these graphical overlays are applied using generally known augmented reality techniques. The foregoing examples illustrate two voting options for ease of illustration. However, in various embodiments, voting events can be configured to include any number of voting options. Moreover, a voting option can be used to vote for a particular action to be performed by a broadcaster, a particular filter to be applied to a live content stream, or both.

Figure 5:
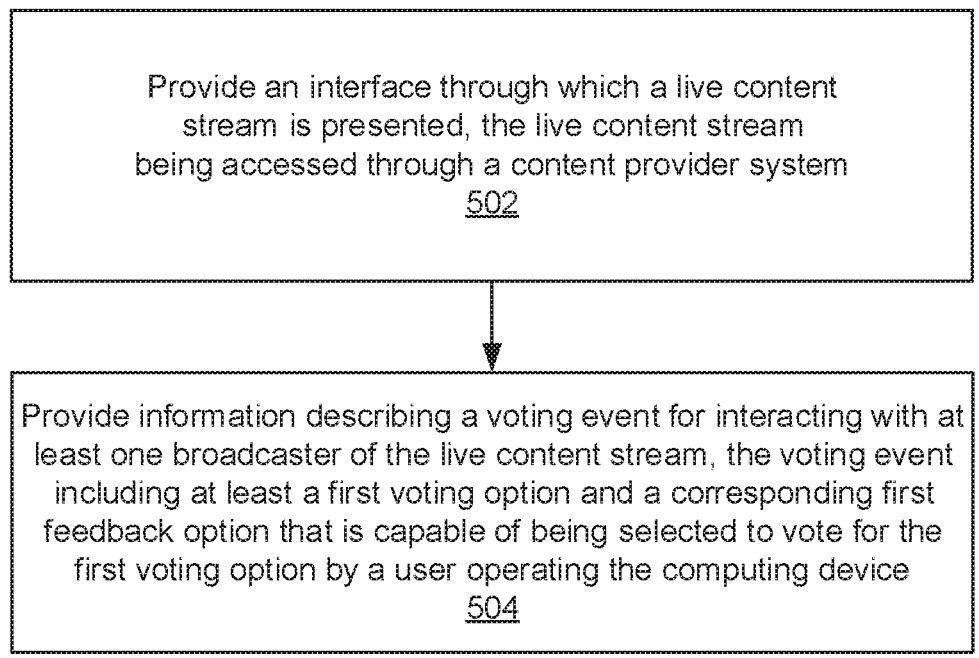
FIG. 5 illustrates an example process, according to various embodiments of the present disclosure.

FIG. 5 illustrates an example process 500, according to various embodiments of the present disclosure. It should be appreciated that there can be additional, fewer, or alternative steps performed in similar or alternative orders, or in parallel, within the scope of the various embodiments discussed herein unless otherwise stated.

At block 502, the example process 500 provides an interface through which a live content stream is presented. The live content stream can be accessed through a content provider system. At block 504, information describing a voting event for interacting with at least one broadcaster of the live content stream is provided. The voting event can include at least a first voting option and a corresponding first feedback option that is capable of being selected to vote for the first voting option by a user operating the computing device.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
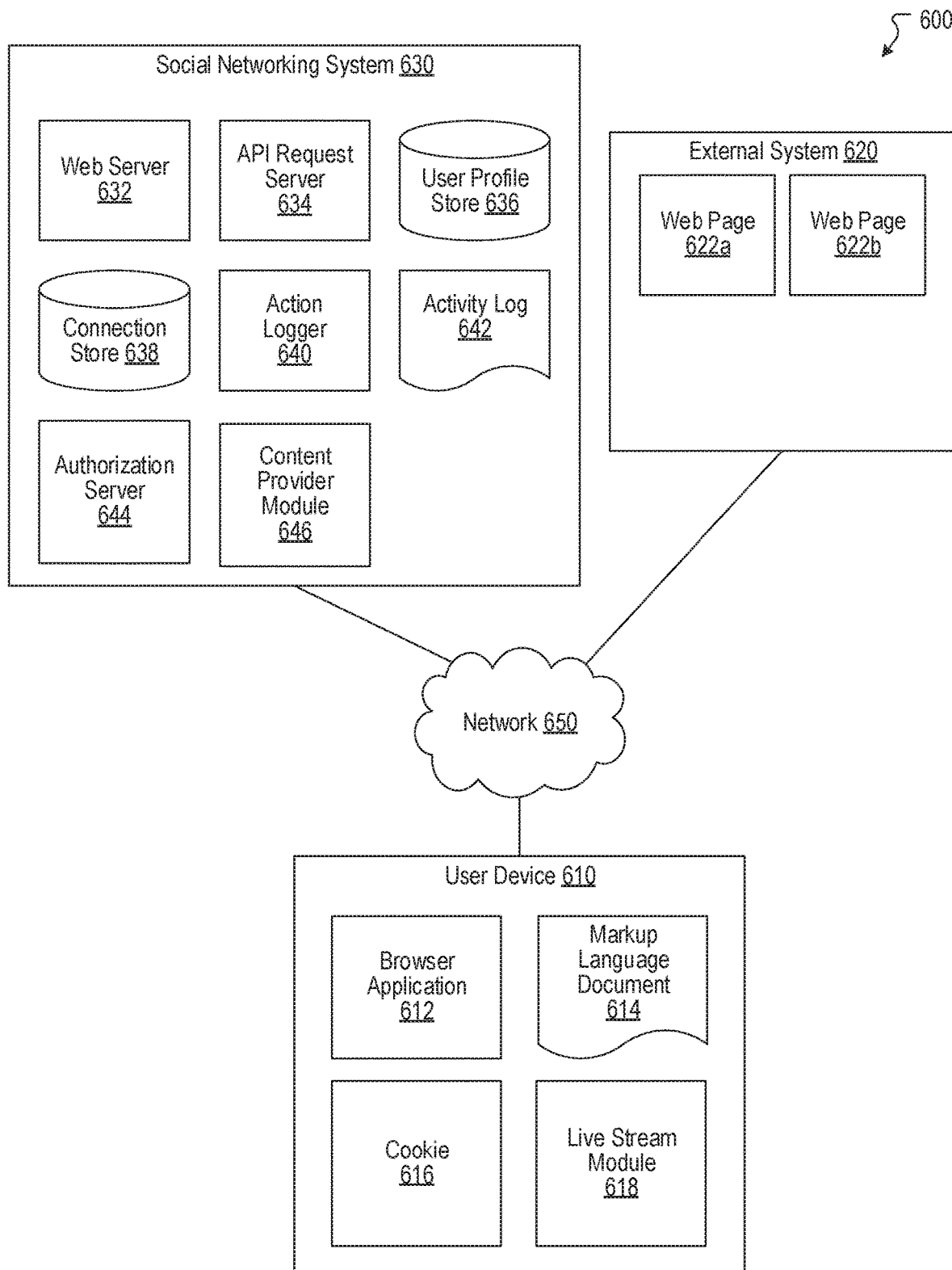
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622*a*, 622*b*, which are communicated to the user device 610 using the network 650. The external system 620 is separate from the social networking system 630. For example, the external system 620 is associated with a first domain, while the social networking system 630 is associated with a separate social networking domain. Web pages 622*a*, 622*b*, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102 of FIG. 1. In some embodiments, the user device 610 can include a live stream module 618. The live stream module 618 can, for example, be implemented as the live stream module 106 of FIG. 1. As discussed previously, it should be appreciated that there can be many variations or other possibilities.

Hardware Implementation

Figure 7:
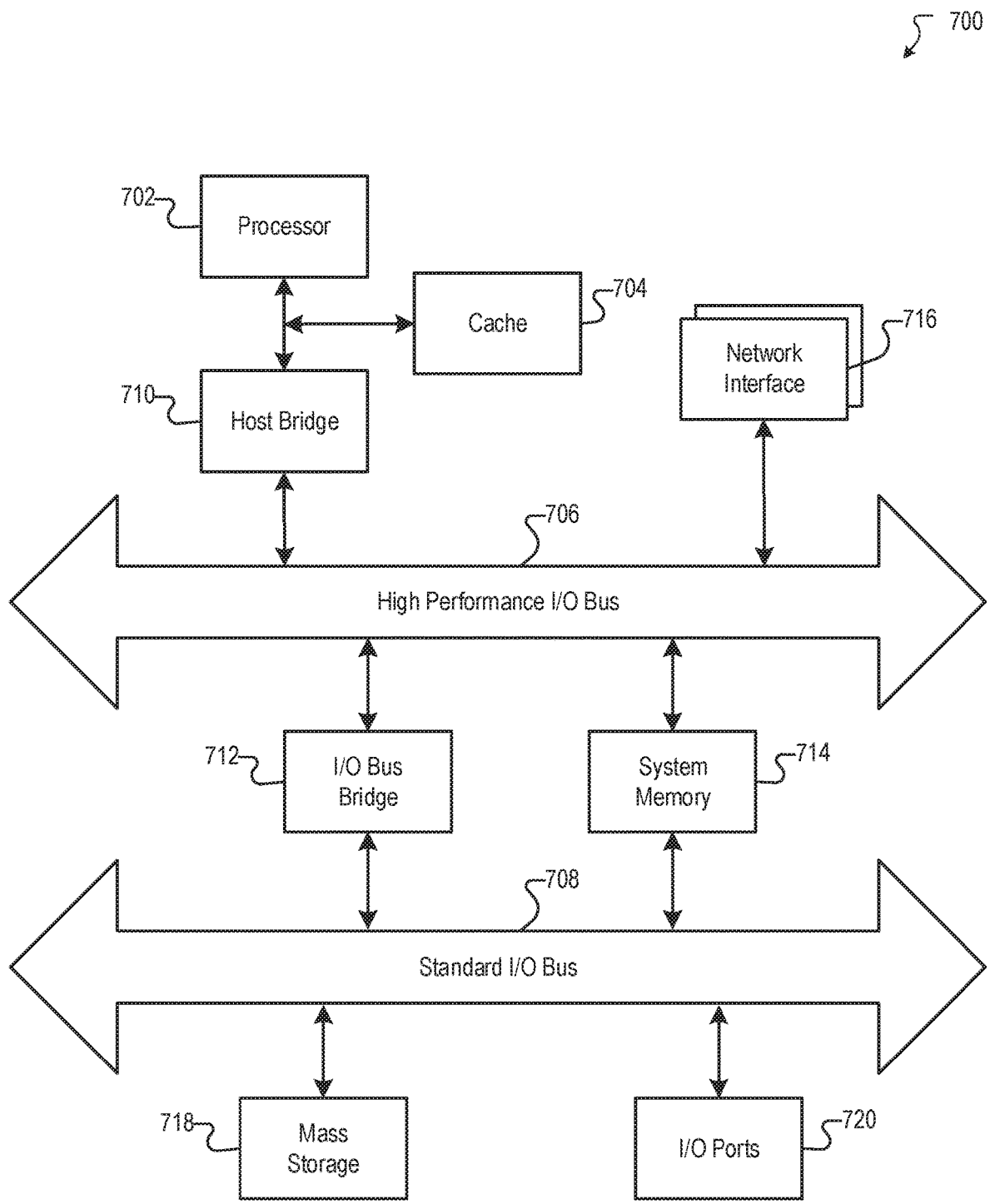
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   providing, by a computing system, an interface through which a live content stream is accessible, wherein the interface includes a plurality of feedback options to interact with the live content stream;
   providing, by the computing system, a visual prompt in the interface, wherein the visual prompt prompts viewers of the live content stream to select at least one specified feedback option included in the plurality of feedback options to communicate a request for at least one broadcaster of the live content stream; and
   providing, by the computing system, the request for the at least one broadcaster through a broadcaster interface based at least in part on a threshold number of selections of the at least one specified feedback option.

2. The computer-implemented method of claim 1, wherein the request prompts the at least one broadcaster to perform a verbal or physical action.

3. The computer-implemented method of claim 1, wherein the at least one specified feedback option is selected to cast a vote for one or more actions to be performed by the at least one broadcaster.

4. The computer-implemented method of claim 3, wherein a notification to request the one or more actions to be performed by the at least one broadcaster is provided when a threshold count of votes are cast for the one or more actions.

5. The computer-implemented method of claim 3, wherein a notification to request the one or more actions to be performed by the at least one broadcaster is provided when a threshold count of distinct viewers of the live content stream cast votes for the one or more actions.

6. The computer-implemented method of claim 1, wherein the request prompts the at least one broadcaster to apply at least one filter to visually modify the live content stream.

7. The computer-implemented method of claim 6, wherein a notification to request application of the at least one filter by the at least one broadcaster to visually modify the live content stream is provided when a threshold count of votes are cast for the one or more actions.

8. The computer-implemented method of claim 6, wherein a notification to request application of the at least one filter by the at least one broadcaster to visually modify the live content stream is provided when a threshold count of distinct viewers of the live content stream cast votes for the one or more actions.

9. The computer-implemented method of claim 6, wherein the at least one filter to visually modify the live content stream corresponds to at least one of a text overlay, graphical overlay, virtual doodle, text animation, graphical animation, or placement of a face mask.

10. The computer-implemented method of claim 1, wherein the at least one specified feedback option corresponds to at least one of a like option, a reaction option, or an option to comment in response to the live content stream through the content provider system.

11. A system comprising:
    at least one processor; and
    a memory storing instructions that, when executed by the at least one processor, cause the system to perform:
    providing an interface through which a live content stream is accessible, wherein the interface includes a plurality of feedback options to interact with the live content stream;
    providing a visual prompt in the interface, wherein the visual prompt prompts viewers of the live content stream to select at least one specified feedback option included in the plurality of feedback options to communicate a request for at least one broadcaster of the live content stream; and
    providing the request for the at least one broadcaster through a broadcaster interface based at least in part on a threshold number of selections of the at least one specified feedback option.

12. The system of claim 11, wherein the request prompts the at least one broadcaster to perform a verbal or physical action.

13. The system of claim 11, wherein the at least one specified feedback option is selected to cast a vote for one or more actions to be performed by the at least one broadcaster.

14. The system of claim 13, wherein a notification to request the one or more actions to be performed by the at least one broadcaster is provided when a threshold count of votes are cast for the one or more actions.

15. The system of claim 13, wherein a notification to request the one or more actions to be performed by the at least one broadcaster is provided when a threshold count of distinct viewers of the live content stream cast votes for the one or more actions.

16. A non-transitory computer-readable storage medium including instructions that, when executed by at least one processor of a computing system, cause the computing system to perform a method comprising:

providing an interface through which a live content stream is accessible, wherein the interface includes a plurality of feedback options to interact with the live content stream;

providing a visual prompt in the interface, wherein the visual prompt prompts viewers of the live content stream to select at least one specified feedback option included in the plurality of feedback options to communicate a request for at least one broadcaster of the live content stream; and providing the request for the at least one broadcaster through a broadcaster interface based at least in part on a threshold number of selections of the at least one specified feedback option.

17. The non-transitory computer-readable storage medium of claim 16, wherein the request prompts the at least one broadcaster to perform a verbal or physical action.

18. The non-transitory computer-readable storage medium of claim 16, wherein the at least one specified feedback option is selected to cast a vote for one or more actions to be performed by the at least one broadcaster.

19. The non-transitory computer-readable storage medium of claim 18, wherein a notification to request the one or more actions to be performed by the at least one broadcaster is provided when a threshold count of votes are cast for the one or more actions.

20. The non-transitory computer-readable storage medium of claim 18, wherein a notification to request the one or more actions to be performed by the at least one broadcaster is provided when a threshold count of distinct viewers of the live content stream cast votes for the one or more actions.

* * * * *